Patented Sept. 11, 1934

1,973,407

UNITED STATES PATENT OFFICE 1,973,407

PROCESS OF CONDITIONING CRYSTALLINE MATERIALS

Edwin Cowles, Sewaren, N. J., assignor to The Electric Smelting & Aluminum Company, Sewaren, N. J.

No Drawing. Application December 23, 1931, Serial No. 582,870

20 Claims. (Cl. 83—93)

This invention relates to processes of conditioning hydrated crystalline materials of the kind in which adjustment of crystalline structure takes place after crystallization, such for example as certain silicates of alkali metaloxides and similar crystalline materials and compounds and mixtures thereof.

Materials of this kind such, for example, as meta silicate of soda, have heretofore been permitted to crystallize, and have then been stored or aged in bins to permit the crystalline structure to adjust itself, whereupon the material has been ground and then packed. In the case of some materials of this kind, it has, however, been found that ground material sometimes becomes caked or hardened into a larger mass or in lumps in the packages.

The objects of this invention are to provide a process, whereby crystallized materials can be treated or conditioned in such a way that the final character of the material can be definitely controlled to prevent caking or agglomeration of the material after the same is ground and packed; also to provide a process of this kind in accordance with which crystalline compounds of a relatively low water content can be economically produced; also to provide a process of this kind in which the moisture content of a crystalline material can be reduced while the material is being conditioned to accelerate the final adjustment of its crystalline structure; also to provide a process of this kind by means of which the time required to condition crystalline compounds is materially reduced and the cost of production of the compounds is also lowered; also to improve processes of this kind in other respects hereinafter specified.

The anhydrous silicates of alkali metal oxides are difficult to dissolve in water without the use of special apparatus, and consequently, it is customary for manufacturers of products of this kind to dissolve the anhydrous products in water and permit the solutions to crystallize or otherwise produce them as hydrated products, which are quite readily soluble in water. This invention deals particularly with the treatment of the hydrated crystallizable materials after the same are crystallized. These materials may include not only alkali metal oxide silicates, but chemical compounds having similar physical characteristics, such, for example, as trisodium phosphate or borax, and also any mixtures of these products with other materials. These materials, after they have become crystallized, have heretofore been generally aged in piles or in bins in order to permit the crystalline structure to reach an equilibrium or to become adjusted. For example, meta sodium silicate requires nine molecular parts of water for a saturated crystalline structure, but the material will crystallize with as low as about 45 per cent of moisture. When a quantity of moisture is present in the solution, which is crystallized, which is less than nine molecular parts, it has been found that some time is required before an equilibrium is reached in the material in which all portions of the material have an approximately equal water content, and in which the crystalline growth or structure is completed. It is generally assumed that during the crystallization of a mass, such particles as have become crystallized with a smaller proportion of water, will take water from other particles which have become crystallized with a larger proportion of water. The material is not ground until an equalized condition has been reached, for the reason that if the adjustment of the crystalline structure were completed after grinding, all or most of the ground material would agglomerate or become caked. Considerable time, therefore, must elapse before the material is ready for grinding.

In accordance with my improved process, the conditioning of the material is hastened and kept under accurate control, so that the final product will be uniform at all times. It is also possible in accordance with my invention to reduce the moisture content, if desired, so that materials containing the moisture necessary to produce crystallization, as in accordance with my process, may have some of this moisture removed before packing.

In accordance with my improved process, if the material immediately after crystallization thereof is in large slabs or pieces, it is broken up or crushed into lumps or pieces of moderate size, so as to be easily handled. The freshly crystallized material preferably is then aged and cooled in any suitable manner, for example, by subjecting the same to a current of cooling gas, such as air, which removes heat which was generated in the material during the crystallization and which is being generated during the adjustment of the crystalline structure. By keeping the temperature of the crushed material low, the adjustment of the crystalline structure is speeded up. In order to further accelerate the adjusting of the crystalline structure, the materials may be agitated in any suitable or desired manner while subjected to the currents of cooling gas or air. For example, the material may be placed into a rotary container or drum, and tumbled in the same, while cool air currents are passed through the drum. The material is much more quickly aged or conditioned when treated in this manner, which is probably due to a more rapid and efficient carrying away of heat from the lumps of material than would be possible if the material were stored in a bin or pile, as was heretofore commonly done, and the actual tumbling or jarring of the lumps also acelerates the final adjustment of the crystalline structure. Furthermore, there is a decided tendency for the crushed material, when in piles, to become caked or agglomerated so that considerable labor is necessary to again break up the pile or stack of the crushed material. When treated according to my method, such caking or agglomeration is entirely prevented. I have found that about five hours of treatment of the material in a conditioner or rotary drum of this kind is often sufficient, and thereupon the material is preferably stored in bins for at least twenty-four hours, at the end of which time, the material is ready for grinding. By tumbling the lumps of material, any sharp edges or points are broken off or dulled, and this probably is responsible for the fact that when this crushed material is stored in bins, the lumps do not tend to agglomerate or to adhere to each other, so that the material is always easily handled after storage for this period. This period of storage is materially less than that necessary heretofore, in which case at least forty-eight hours storage has often been found necessary before grinding of the material.

The grinding may be carried on as heretofore, and, of itself, is no part of this invention. In accordance with my process, however, I further treat the ground material for the purpose of further conditioning the same prior to packing, while heretofore the material after grinding has generally immediately been packed.

The treatment of the ground material may be somewhat similar to that of the crushed material, in that the ground material is subjected to the action of air currents which may be conditioned to produce the desired results, and preferably, the material is agitated during treatment with the air currents to facilitate the access of the air to the ground particles of material. If the ground material has the proper water content, the air used may be cool air for the purpose of removing heat from the material resulting from the grinding and from the fact that certain adjustment of the crystalline structure again takes place after the grinding operation, which develops a certain amount of heat in the material for a period of time after grinding. If the material is immediately packed after grinding, this heat may cause the material to cake or become solidified in a relatively large mass or in lumps. The air currents result in the cooling of the material, so that the crystalline structure becomes quickly adjusted, and so that the material can be placed in packages or containers without danger of becoming caked.

The ground material is preferably treated in a rotary drum similar to drums used for drying sugar and similar materials, and preferably, the drum is so designed and operated that the material passes through the same from the receiving end to the discharge end in a period of about five hours. The drum is rotated slowly so that the particles of material are again subjected to a rolling or tumbling action which has in this case a very important effect upon the final properties of the material in avoiding caking in the containers during shipment or storage. This is due to the fact that the material during the tumbling or rolling movement of the same in the drum has the sharp edges of the material ground or broken off by abrasive contact with adjacent particles of material. Crystalline material of this kind having sharp edges or points has a far greater tendency to agglomerate or to form cakes or lumps than material in which the particles have more or less rounded or smooth surfaces.

As has already been stated, under certain conditions, it is desirable that the ultimate product should contain less moisture than is necessary for rapid and uniform crystallization of the product. In such cases, the material, after the grinding operation, is subjected first to air currents conditioned for the purpose of removing moisture. Preferably, such currents of air should be heated and the air should also be low in humidity or moisture content. When the material is in finely ground form and is being agitated, moisture can be removed from the same to best advantage, since the material then presents a large surface for contact with currents of drying air and this results in a uniform drying of the material, so that further adjustment of the crystalline structure is materially reduced over what would be the case if larger lumps of the material were subjected to a drying medium, which would again require time for equalization of the moisture content within the material. The ground material, therefore, can be quickly conditioned in this step of my process. The removal of moisture from the material may be carried on during the conditioning of the material.

The conditioning drum preferably has suitable means therein for carrying the material toward the top of the drum during the rotation of the same, and then dropping the material through the drum while air currents are passed through the same. After the desired conditioning of the material, currents of cooling air may, if necessary, be passed through the apparatus, or the material may pass through another apparatus in which it can be quickly cooled. The material is then ready for packing and will have no tendency to cake or agglomerate in the packages when exposed to ordinary atmospheric conditions. The material will, therefore, be free flowing and readily usab'e by the ultimate consumer.

The process described has the advantage that the material except for the time of storage before grinding may pass continuously through the process. The time required from the crystallization of the material to the packaging of the same is very materially reduced by this process, and furthermore, the material is kept under accurate control, so that any desired moisture content can be readily obtained, and so that the granular structure of the material is such that the tendency to become caked or to form lumps is entirely eliminated, unless, of course, the material should be subjected to temperatures approaching their melting points.

The treatment of the material in a rotary conditioner after crushing and after grinding has the advantages that the large mass of material in the conditioner provides for sufficient time to permit the material to be sufficiently treated during its passage through the conditioner. Furthermore, the tumbling of the material accelerates the final adjustment of the crystalline structure, so that a material saving in time is effected by the tumbling of the material. The tumbling has the third advantage of breaking or abrading off any sharp edges on the particles of crushed or ground material, so that the tendency of the particles or lumps to cake is very materially reduced. Furthermore, if moisture is to be removed from the material, this can be done by merely heating or otherwise treating the air passing into the rotary conditioners.

I claim as my invention:

1. The process of conditioning hydrated crystalline materials during the adjustment of their crystalline structure, which includes crushing the crystallized material into relatively large lumps, and subjecting the crushed material to cool gas currents during the adjustment of the crystalline structure of the compound.

2. The process of conditioning hydrated silicious alkali metal oxide compounds, which includes crushing the freshly crystallized compound into relatively large lumps suitable for grinding, and agitating the material in the presence of air currents during the adjustment of the crystalline structure of the material.

3. The process of conditioning hydrated silicious alkali metal oxide compounds, which includes crushing the freshly crystallized compound, cooling the material in a container through which cool gas currents pass and accelerating the adjustment of the crystalline structure by tumbling the lumps in said container.

4. The process of conditioning hydrated silicious crystalline materials during adjustment of their crystalline structure, which includes ageing the freshly crystallized material to permit adjustment of its crystalline structure, grinding the material, and cooling the ground material with gas currents during further adjustment of the crystalline structure following grinding.

5. The process of conditioning hydrated crystalline materials, which includes subjecting the material, during the adjustment of its crystalline structure, to agitation in the presence of gas currents having a suitable temperature and humidity to effect cooling and removal of moisture from the material.

6. The process of conditioning hydrated silicious crystalline materials during adjustment of their crystalline structure, which includes ageing the freshly crystallized material to permit adjustment of its crystalline structure, grinding the material, agitating the ground material, and passing gas currents through the ground material while in motion to modify the temperature thereof.

7. The process of conditioning hydrated silicious crystalline materials during adjustment of their crystalline structure, which includes ageing the freshly crystallized material to permit adjustment of its crystalline structure, grinding the material, and subjecting the ground material to gas conditioned to control the temperature and moisture content of the finished material.

8. The process of conditioning hydrated silicious crystalline materials during adjustment of their crystalline structure, which includes ageing the freshly crystallized material to permit adjustment of its crystalline structure, grinding the material, and subjecting the ground material to drying currents of gas to decrease the moisture content of the material.

9. The process of conditioning hydrated silicious crystalline materials during adjustment of their crystalline structure, which includes breaking the freshly crystallized material into coarse lumps, ageing the broken material to permit adjustment of its crystalline structure, grinding the material, subjecting the ground material to drying currents of gas to decrease the moisture content of the material, and then cooling the material.

10. The process of conditioning hydrated silicious crystalline materials during adjustment of their crystalline structure, which includes breaking the freshly crystallized material into coarse lumps, ageing the broken material to permit adjustment of its crystalline structure, grinding the material, subjecting the ground material to agitation, and passing conditioned gas through the material while being agitated.

11. The process of conditioning hydrated silicious crystalline materials during adjustment of their crystalline structure, which includes breaking the freshly crystallized material into coarse lumps, ageing the broken material to permit adjustment of its crystalline structure, grinding the material, and reducing the moisture content of the material in a rotary drum.

12. In a process of conditioning hydrated silicious crystalline materials of the kind in which adjustment of the crystalline structure takes place after crystallization, the step of accelerating such adjustment of the crystalline structure of the material by agitating the material wholly in a gaseous medium during such adjustment.

13. In a process of conditioning hydrated silicious crystalline materials of the kind in which adjustment of the crystalline structure takes place after crystallization, the step of accelerating adjustment of the crystalline structure of the material by cooling the same with currents of gas during said adjustment of the crystalline structure.

14. In a process of conditioning hydrated silicious crystalline materials of the kind in which adjustment of the crystalline structure takes place after crystallization, the steps of simultaneously agitating and cooling the material during the adjustment of its crystalline structure to accelerate said adjustment.

15. In a process of conditioning hydrated silicious crystalline materials of the kind in which adjustment of the crystalline structure takes place after crystallization, the steps of simultaneously agitating the material to accelerate the adjustment of the crystalline structure and removing moisture from the material during said adjustment of the crystalline structure.

16. A process of conditioning crystalline hydrated silicious alkali metal oxide materials, which includes breaking the freshly crystallized material into coarse lumps, agitating the lumps, passing cooling currents of gas into contact with the lumps while the same are agitated to remove from the material heat generated during crystallization and during adjustment of the crystalline structure, further ageing the material without agitation and gas currents, grinding the material to the size desired, subjecting the ground material to agitation, and passing currents of gas through the ground material while the material is agitated.

17. A process of conditioning crystalline hydrated silicious alkali metal oxide materials, which includes breaking the freshly crystallized material into coarse lumps, agitating the lumps, passing cooling currents of gas into contact with the lumps while the same are agitated to remove from the material heat generated during crystallization and during adjustment of the crystalline structure, further ageing the material without agitation and gas currents, grinding the material to the size desired, subjecting the ground material to agitation, passing heated gas through the ground material to remove moisture therefrom, and then cooling the material.

18. A process of conditioning hydrated crystalline materials during the adjustment of their crystalline structure, which includes crushing the crystallized material into relatively large lumps, subjecting the crushed material to cool gas currents, and accelerating the adjustment of the crystalline structure of the material by agitation of the same.

19. The process of conditioning hydrated silicious alkali metal oxide compounds, which includes ageing the freshly crystallized material to permit adjustment of its crystalline structure, grinding the material, and then cooling the material during further adjustment of the crystalline structure.

20. The process of conditioning hydrated silicious alkali metal oxide compounds, which includes breaking the crystallized material into relatively large lumps, ageing the material to permit adjustment of its crystalline structure, then grinding the material, and cooling the ground material during further adjustment of its crystalline structure.

EDWIN COWLES.